United States Patent
McVicker

(10) Patent No.: US 9,864,258 B1
(45) Date of Patent: Jan. 9, 2018

(54) SCUBA REGULATOR MOUNT SYSTEM

(71) Applicant: Michael W McVicker, Pensacola, FL (US)

(72) Inventor: Michael W McVicker, Pensacola, FL (US)

( * ) Notice: Subject to any disclaimer, the term of this patent is extended or adjusted under 35 U.S.C. 154(b) by 411 days.

(21) Appl. No.: 14/692,848

(22) Filed: Apr. 22, 2015

(51) Int. Cl.
*G03B 17/08* (2006.01)
*B63C 11/22* (2006.01)
*G03B 17/56* (2006.01)

(52) U.S. Cl.
CPC .............. *G03B 17/08* (2013.01); *B63C 11/22* (2013.01); *G03B 17/561* (2013.01)

(58) Field of Classification Search
CPC ........ G03B 17/08; G03B 17/561; B63C 11/22
USPC ............. 248/689, 227.3, 230.6, 316.1, 316.6
See application file for complete search history.

(56) References Cited

U.S. PATENT DOCUMENTS

| | | | |
|---|---|---|---|
| 4,683,881 A * | 8/1987 | Hansen | B63C 11/2227 128/204.26 |
| 6,028,627 A * | 2/2000 | Helmsderfer | A42B 3/042 345/8 |
| 6,181,644 B1 | 1/2001 | Gallagher | |
| 7,165,013 B2 | 1/2007 | Watson | |
| 8,857,775 B1 | 10/2014 | Clearman et al. | |
| 8,870,475 B1 | 10/2014 | Bennett et al. | |
| 9,426,341 B1 * | 8/2016 | Baldrige | F16M 11/041 |
| 2007/0036539 A1 | 2/2007 | Martinez et al. | |
| 2013/0107111 A1 | 5/2013 | Campbell et al. | |
| 2013/0184033 A1 | 7/2013 | Willenborg | |
| 2014/0103181 A1 | 4/2014 | Duerigen et al. | |
| 2014/0226270 A1 | 8/2014 | Holopainen et al. | |
| 2014/0252188 A1 | 9/2014 | Webster | |
| 2015/0070580 A1 * | 3/2015 | Graether | A61B 3/152 348/376 |
| 2015/0076184 A1 * | 3/2015 | Achenbach | G03B 17/561 224/181 |
| 2015/0177597 A1 * | 6/2015 | Harrison | G03B 17/561 396/419 |
| 2015/0253651 A1 * | 9/2015 | Russell | G03B 17/561 224/181 |
| 2015/0309396 A1 * | 10/2015 | Rohrer | G03B 17/561 224/181 |
| 2015/0312446 A1 * | 10/2015 | Blackman | H04N 5/2252 348/373 |
| 2015/0316205 A1 * | 11/2015 | Bennett | F16M 13/00 224/181 |

* cited by examiner

*Primary Examiner* — Justine Yu
*Assistant Examiner* — Timothy Stanis
(74) *Attorney, Agent, or Firm* — Peter Loffler

(57) ABSTRACT

A mounting system allows an action camera system or other device to be removably attached to a SCUBA demand regulator. A flexible ring encircles an outer surface of the regulator and is cinched thereabout, the shape of the ring corresponding to the shape of the outer surface of the regulator. A riser, which may be one or more prongs, rises upwardly from the ring and has a mount plate on a distal end thereof. The mount plate adhesively receives a flat adhesive plate of a desired device such as the action camera system.

8 Claims, 4 Drawing Sheets

SCUBA REGULATOR MOUNT SYSTEM

BACKGROUND OF THE INVENTION

1. Field of the Invention

The present invention relates to a camera mount for use by SCUBA divers, wherein the mount is attached to a demand regulator used by the diver.

2. Background of the Prior Art

Recently, there has been an explosion in the production of extreme action videos and still photographs. Photographs and videos are now taken in almost any extreme endeavor including skydiving, SCUBA diving, skiing, mountain biking, motocross racing, zip lining, as well as less extreme endeavors such paddle boarding, and snorkeling. A major contributor to this photographic explosion is the proliferation of small camcorders (often simply called cameras) that produce high definition videos and stills, which camcorders are rugged, fast, easy to use, produce the videos and stills using a wide angle lens, are held within a waterproof housing, and are mountable on a wide variety of surfaces. The main contender in such camcorders is the HERO® line of cameras produced by GoPro, Incorporated of San Mateo Calif., although other companies produce similar types of cameras. The GoPro cameras are very small, fitting comfortably into the palm of a user's hand, yet are extremely versatile and are loved by extreme sports enthusiasts as well as recreational photographers the world over. The GoPro cameras and others in the field can be attached to a wide variety of mounts, including various helmet mounts, chest mounts, head mounts, handlebar mounts, roll bar mounts, even dog mounts, among others, so that the cameras can be used in almost any setting where a photograph or video is desired in order to capture some stunning moments of an event.

One sport where these extreme action cameras enjoy use is in SCUBA diving. Typically, a SCUBA diver uses a head mount to attach the camera to his or her head and photographs the beauty and variety of the undersea world. While such usage has produced many a stunning video and photograph, there is a certain amount of frustration in head mounting the camera during SCUBA diving. Due to the fact that the camera is being used underwater, the flow of the water and the diver's movement through the water places substantially more force on the camera and mount relative to the forces experienced above the water from the air. As such, the camera can shift or sway without the diver's knowledge so that the diver may have a wonderful array of videos and stills of the top of his or her head. As communication below the water's surface is via hand signals, it is difficult for the diver to assess from others whether or not the camera is mounted properly.

What is needed is a device that allows action cameras to be used during SCUBA diving, which device minimizes the potential for undesired camera shift or camera sway so that the user captures the photographs and videos that the diver desires. Such a device must be of simple design and construction and must not interfere with the SCUBA equipment used by the diver so to not potentially compromise safety.

SUMMARY OF THE INVENTION

The SCUBA regulator mount system of the present invention addresses the aforementioned needs in the art by providing a mount for an action camera, such as a GoPro HERO® camera or other type of action camera or other device such as a flashlight for use during SCUBA diving. The SCUBA regulator mount system is mounted such that the hydrodynamic forces acting on the mounted camera do not undersirably shift or sway the camera in order to help assure the diver that the photographs or videos that are attempted to be captured are in fact properly captured. The SCUBA regulator mount system does not interfere with any of the various safety features used by the diver. The SCUBA regulator mount system is of relatively simple design and construction, being produced using standard manufacturing techniques, so as to be relatively inexpensive to produce so as to be economically attractive to potential consumers for this type of device. The SCUBA regulator mount system is easy to install, use, and maintain.

The SCUBA regulator mount system is comprised of a flexible ring that has a shape corresponding to the shape of an outer surface of the SCUBA demand regulator and encircles the outer surface of the regulator and is tightly cinched thereabout so as to be held in such cinched position. A riser has a proximal end that is attached to the ring and an opposing distal end. The riser extends upwardly from the ring. A mount is attached to the distal end of the riser. The riser may be comprised of a plurality of spaced apart prongs that are each directed inwardly toward one another in extending from their proximal ends to their distal ends. The mount is positioned a sufficient distance from the purge valve of the SCUBA regulator in order to allow a human finger to be able to be positioned between the purge valve and the mount in order to be able press the purge valve as needed. The mount is a relatively flat plate mount that is adhesively attached to a flat adhesive mount of an action camera system or other item such as a flashlight.

BRIEF DESCRIPTION OF THE DRAWINGS

Similar reference numerals refer to similar parts throughout the several views of the drawings.

DESCRIPTION OF THE PREFERRED EMBODIMENT

Figure 1:
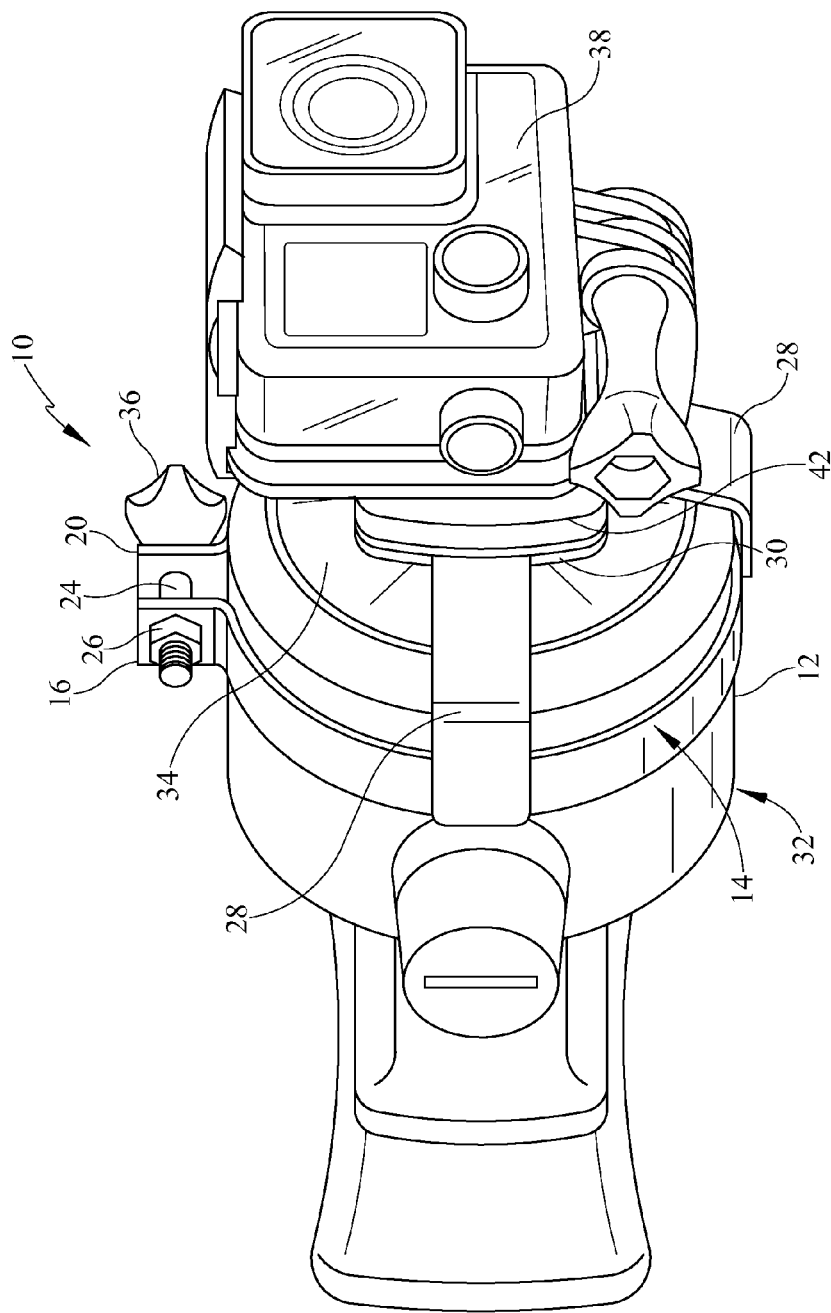
FIG. 1 is perspective view of the SCUBA regulator mount system of the present invention mounted onto the SCUBA demand regulator
Figure 2:
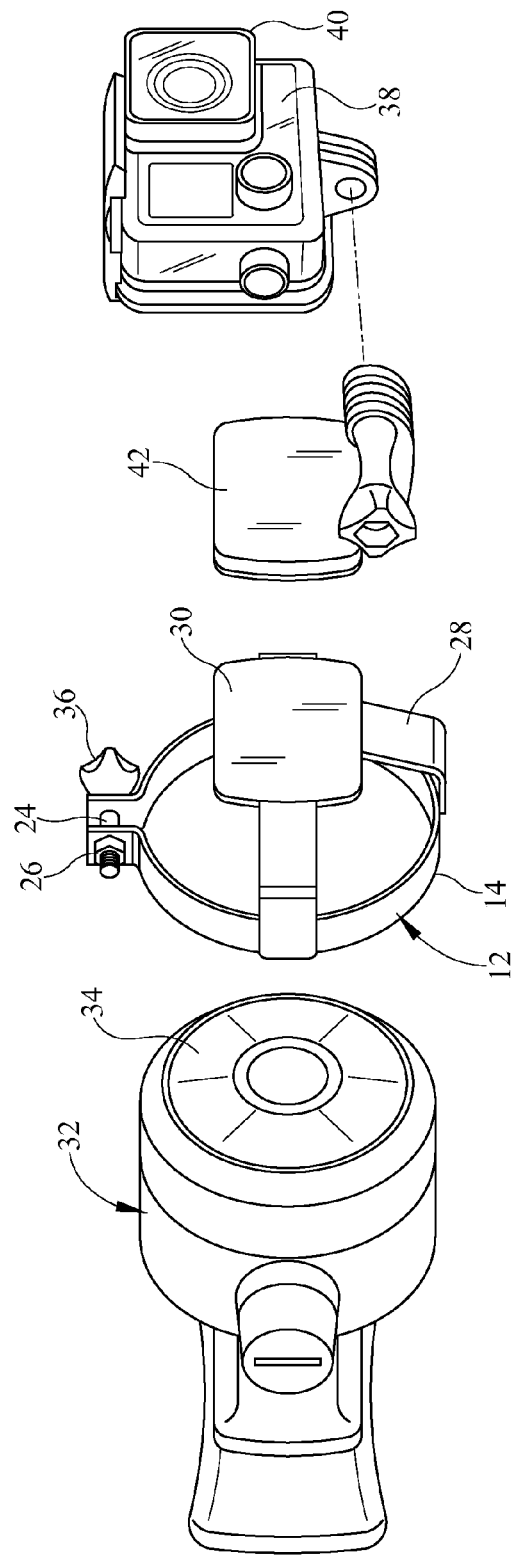
FIG. 2 is an exploded perspective view of FIG. 1.
Figure 3:
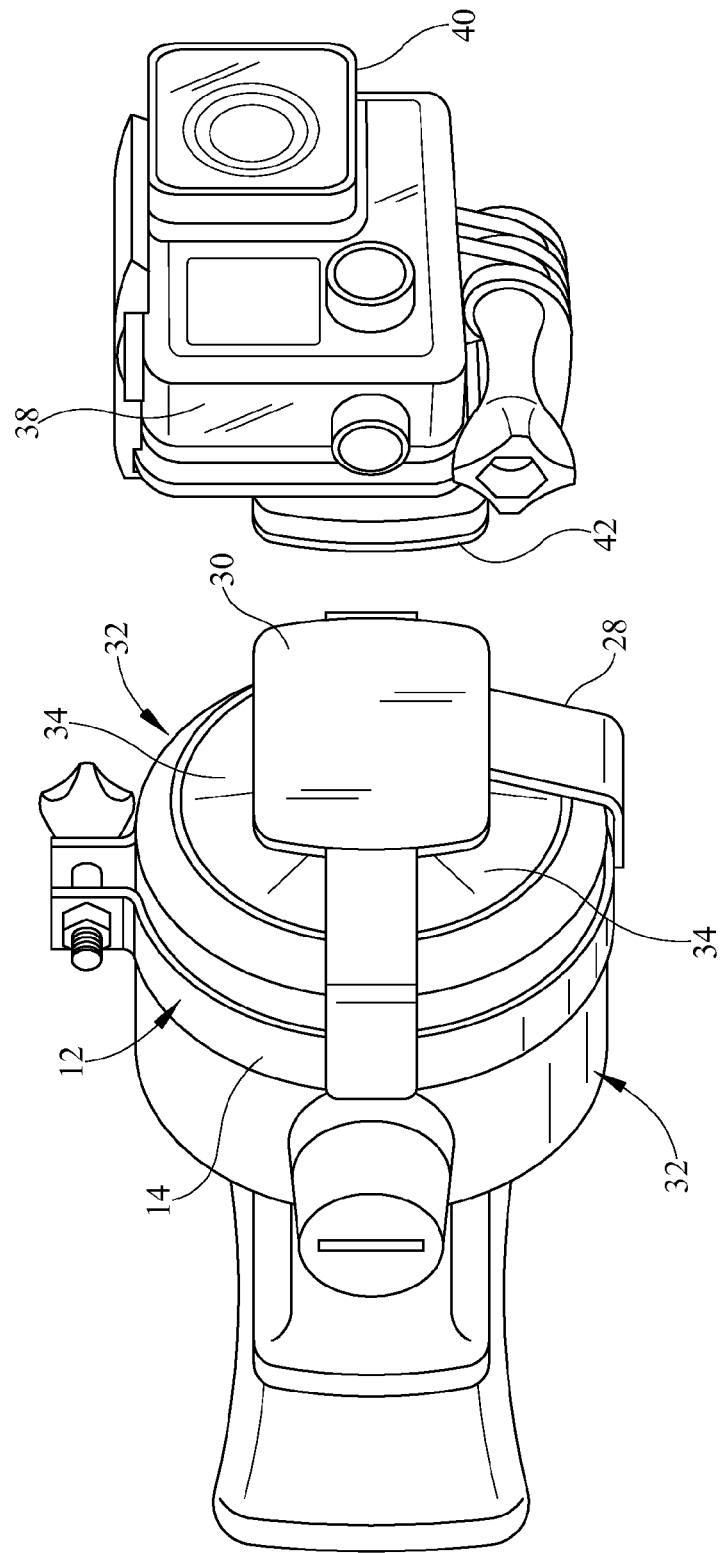
FIG. 3 is a perspective view of the SCUBA regulator mount system with the camera attached to a basic flat adhesive mount about to be attached to the SCUBA regulator mount system.
Figure 4:
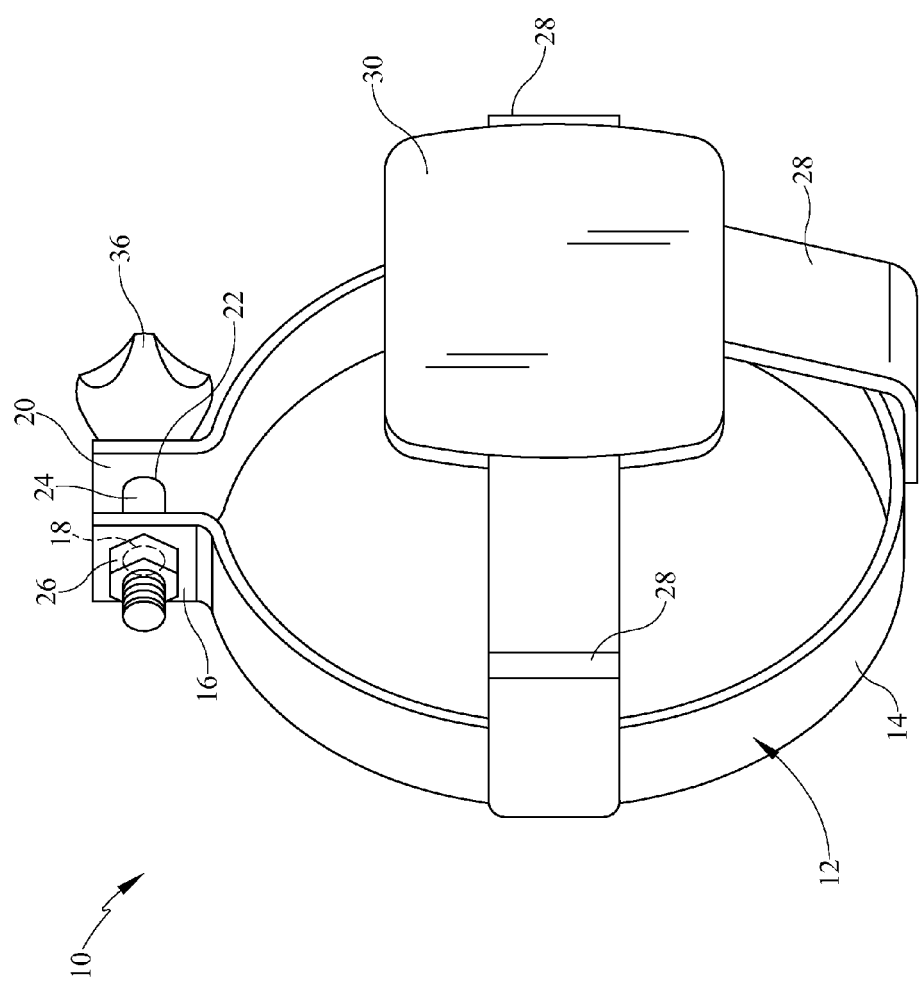
FIG. 4 is a perspective view of the SCUBA regulator mount system.

Referring now to the drawings, it is seen that the SCUBA regulator mount system of the present invention, generally denoted by reference numeral 10, is comprised of a ring clamp 12 that has a flexible ring 14 that has a first end with an outwardly directed first ear 16, the first ear 16 having a first opening 18, the ring 14 also having a second end with an outwardly directed second ear 20, the second ear 20 having a second opening 22 that generally corresponds with the first opening 18 when the first ear 16 and the second ear 20 are positioned proximate one another. A threaded screw 24 passes through the first opening 18 of the first ear 16 and the second opening 22 of the second ear 20 and has a securement nut 26 located thereon.

A riser extends upwardly from the ring 14 and has a flat plate mount 28 on its distal end. As seen, the riser can comprise the illustrated spaced apart prongs 30 that are each attached to an outer surface (or peripheral edge) of the ring 14 in any appropriate fashion (welding, adhesion, the prongs being monolithic with the ring, etc.), the prongs 30 rising upwardly and inwardly. Although a single prong 30 can be used to form the riser, the use of multiple prongs 30, as illustrated, helps reduce vibration of the plate mount 28 and thus helps stabilize the system. Of course the riser can take other forms such as a portion of the ring extending upwardly and the plate mount attached to the end of such extension, etc. The main criteria for the riser is that there be sufficient clearance between the plate mount 28 and the SCUBA demand regulator 32 so that once the a SCUBA regulator mount system 10 is attached, as further described below, the diver has access to the regulator's purge valve 34.

In order to use the SCUBA regulator mount system 10 of the present invention, the threaded screw 24 is passed through the first opening 18 of the first ear 16 and the second opening 22 of the second ear 20 (or vice versa) and is rotated so as to progress the securement nut 26 toward the distal end (opposite the handle 36 end, the term handle being defined broadly as the handle on the threaded screw may be the illustrated finger grip, or may simply be an ordinary screw or bolt head) of the threaded screw 24. This allows the first ear 16 and the second ear 20 to be separated a relatively far distance apart so as to sufficiently open the ring 14 and allow the ring 14 to encircle the regulator 32. Once the ring 14 is in encircling relationship with the outer surface of the regulator 32, the threaded screw 24 is counter-rotated so as to progress the nut 26 toward the handle 36 end of the threaded screw 24 which causes the first ear 16 and the second ear 20 to be brought toward one another, thereby closing the ring 14 and cinching the ring 14 about the outer surface of the regulator 32. The SCUBA regulator mount system 10 is now attached to the SCUBA regulator 32 and is ready for use. A camera 38 held within its waterproof case 40 is attached to a flat adhesive mount 42 in the usual way. The flat adhesive mount 42 is adhesively attached to the plate mount 28 in the usual way. The diver is now ready for some great action pictures while underwater without fear of photographing the top of his or her head.

In order to remove the SCUBA regulator mount system 10, the threaded screw 24 is once again rotated so as to loosen the ring 14 about the SCUBA regulator 32 and when sufficiently loose, the ring 14 is simply removed from thereabout.

Of course the plate mount can be configured so as to receive the corresponding mount of the camera and its case, the specifics of the plate mount being dependent on the specifics of the corresponding camera mount.

Of course, the use of other cinching methods can be used for the ring, such as latches, a worm gear system similar to that used on hose clamps, etc.

Of course devices other than action camera systems can be attached to the plate mount 28, such as a flashlight, etc.

While the ring 14 is illustrated as being generally round, the ring can also of a different shape, such as being generally oval so long as the ring is sized and shaped to encircle the outer surface of the SCUBA regulator 32 and be able to be tightly cinched thereabout.

The ring 14, the riser, and the plate mount 28 can be made from any appropriate material that can withstand the harsh underwater environment including the possibility of saltwater. Such materials can include stainless steel, aluminum, high quality plastic, etc., while the threaded screw 24 and nut 26 can be made from an appropriate metal, with the handle 36 of the threaded screw 24 possibly being made from high quality plastic.

While the invention has been particularly shown and described with reference to an embodiment thereof, it will be appreciated by those skilled in the art that various changes in form and detail may be made without departing from the spirit and scope of the invention.

I claim:

1. A mount system attachable to an outer surface of a SCUBA demand regulator, the SCUBA demand regulator having an outer surface and a purge valve, the mount system comprising:
    a flexible ring adapted to encircle the outer surface of the SCUBA demand regulator and to be tightly cinched thereabout and held in such cinched position;
    a riser having a proximal end attached to the flexible ring and an opposing distal end, the riser extending upwardly from the ring, the riser comprised of a plurality of spaced apart prongs that are each directed inwardly toward one another in extending from their proximal ends to their distal ends; and
    a mount attached to the distal end of the riser.

2. The mount system as in claim 1 wherein the mount is configured to be positioned a sufficient distance from the purge valve in order to allow a human finger to be able to position the human finger between the purge valve and the mount in order to be able press the purge valve.

3. The mount system as in claim 1 wherein the mount is a flat plate mount that is adapted to be adhesively attached to a flat adhesive mount of an action camera system.

4. The mount system as in claim 1 in combination with the SCUBA demand regulator.

5. The mount system in combination with the SCUBA demand regulator as in claim 4 wherein the mount is configured to be positioned a sufficient distance from the purge valve in order to allow a human finger to be able to position the human finger between the purge valve and the mount in order to be able to press the purge valve.

6. The mount system in combination with the SCUBA demand regulator as in claim 4 wherein the mount is a relatively flat plate mount that is adapted to be adhesively attached to a flat adhesive mount of an action camera system.

7. The mount system in combination with the SCUBA demand regulator as in claim 6 in combination with the action camera system.

8. The mount system in combination with the SCUBA demand regulator as in claim 6 wherein the mount is configured to be positioned a sufficient distance from the purge valve in order to allow a human finger to be able to position the human finger between the purge valve and the mount in order to be able to press the purge valve.

* * * * *